Oct. 27, 1959  T. GEORGI  2,910,306
UNIVERSALLY MOUNTED COUPLING PART FOR
TRACTOR-TRAILER FIFTH-WHEELS
Original Filed April 3, 1957  2 Sheets-Sheet 1

INVENTOR:
THEODOR GEORGI
By
Kurt Kelman
AGENT

Oct. 27, 1959 T. GEORGI 2,910,306
UNIVERSALLY MOUNTED COUPLING PART FOR
TRACTOR-TRAILER FIFTH-WHEELS
Original Filed April 3, 1957 2 Sheets-Sheet 2

INVENTOR:
THEODOR GEORGI
By Kurt Kelman
AGENT

United States Patent Office 2,910,306
Patented Oct. 27, 1959

2,910,306

UNIVERSALLY MOUNTED COUPLING PART FOR TRACTOR-TRAILER FIFTH-WHEELS

Theodor Georgi, Hilden, Rhineland, Germany, assignor to Jost Werke Josef Steingass G.m.b.H., Neu-Isenburg, Germany, a corporation of Germany Original application April 3, 1957, Serial No. 650,332, now Patent No. 2,838,326, dated June 10, 1958. Divided and this application April 8, 1958, Serial No. 727,137

9 Claims. (Cl. 280—438)

The present invention relates to couplings constituted by two coupling parts forming a detachable, biaxial, articulated connection between a tractor and a trailer, for instance, and more particularly to a universal mounting for one of the coupling parts of such a coupling.

This is a division of my application Serial No. 650,332, filed April 3, 1957, now Patent No. 2,838,326.

Semitrailer couplings conventionally comprise a slotted fifth wheel attached to the upper side of the rear portion of a truck or tractor and a coupling pin extending downwardly from the lower side of the front portion of a trailer, said pin being releasably connected with the slotted fifth wheel to couple the tractor and trailer together when the pin is engaged in the fifth wheel slot. Different means have been devised for locking the two coupling parts, i.e. the slotted fifth wheel and the coupling pin, in position, my Patent No. 2,838,326 being directed to one such locking mechanism.

It is one object of the present invention to provide a coupling part mounting eliminating heavy moments of torsion about the longitudinal axis of the vehicle occurring on relative movement between the trailer and the tractor, which frequently have caused breaking of the coupling.

It is another object of this invention to make the coupling connection about the longitudinal axis of the truck train flexible and preferably to make this flexibility adjustable.

These and other objects and advantages of the invention are accomplished by mounting one of the two coupling parts constituting a biaxial, articulated connection on a transverse pendulum or rocking shaft which provides flexibility about the longitudinal axis of the connection. The pendulum shaft has two trunnions at its ends which are mounted in crank journals connected to the one coupling part and positioned in a common plane while facing in opposite directions.

Further advantages and features of the invention will be disclosed in the following detailed description of certain preferred embodiments thereof which are illustrated by way of example in the accompanying drawing wherein.

Figure 1:
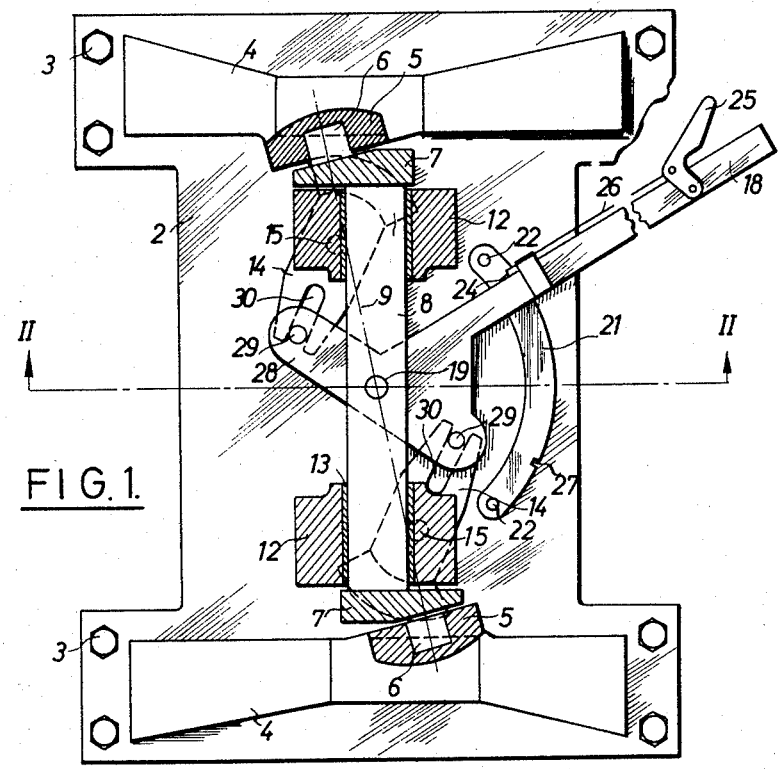
Fig. 1 is a horizontal section along line I—I of Fig. 2 showing one embodiment of the invention.
Figure 2:
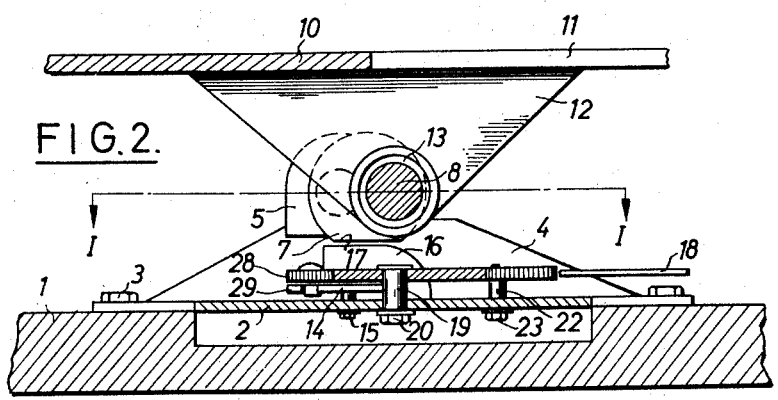
Fig. 2 is a vertical section along line II—II of Fig. 1.

Referring now to Figs. 1–5, the invention is illustrated in connection with a semitrailer coupling. As shown, a base plate 2 is bolted at 3 to the upper side of the rear portion of a truck or tractor chassis 1. A pair of bearing brackets 4 are mounted on the base plate. Each bracket has a crank journal 5, the two journals being parallel to each other and tilted in respect of brackets 4. Trunnions 6 are mounted on the end webs 7 of the pendulum or rocking shaft 8 to support the shaft in the crank journals 5. The pivots or trunnions 6 lie on common axis 9 which is inclined relative to the plane of symmetry of the coupling. When the shaft 8 is rotated about axis 9 on trunnions 6, it will rock back and forth in a pendulum movement. The fifth wheel or platform 10 with its king or coupling pin entry slot 11 is pivotally mounted on shaft 8 by means of bearing brackets 12. The bearing brackets 12 are mounted on shaft 8 by means of sleeves 13 and are secured to the fifth wheel. The coupling of a king pin with the slotted fifth wheel forms no part of the present invention and is, therefore, not further described and illustrated, one such structure being disclosed and claimed in my above-mentioned application.

The rocking or pendulum movement of shaft 8 may be limited or completely eliminated by the following mechanism:

Pivotal bifurcated follower members 14 are mounted on base plate 2 by means of bolts 15. The followers 14 are movable to cooperate with their heads 16 with a flat camming surface 17 on the underside of end webs 7 of the shaft 8. When the heads 16 engage the camming surfaces 17 of the end webs of the shaft (see Fig. 3), the shaft is locked in horizontal position and cannot rock back and forth.

Figure 4:
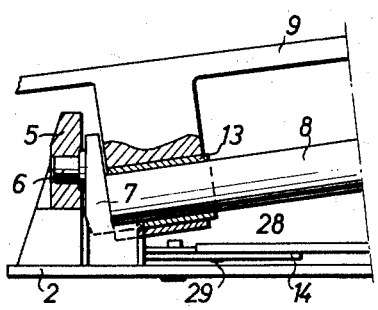
Figs. 3 and 4 illustrate details of the mounting, viewed in the direction of travel, in different operating positions.
Figure 3:
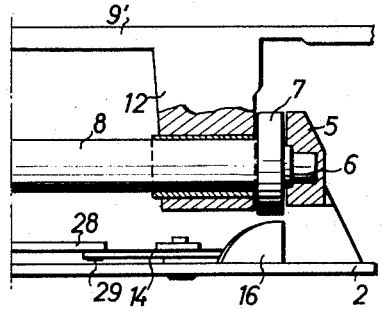
Figure 5:
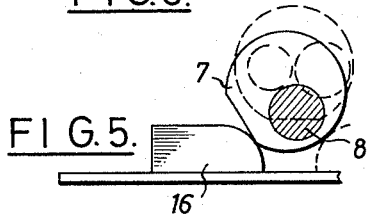
Fig. 5 shows a side view of one detail of the mounting to illustrate the movement of the pendulum shaft.

The position of the followers 14 is controlled by lever 18 which is pivoted on the base plate 2 by means of bolt 19 secured to the plate by nut 20. A transversely slotted arcuate stop plate 21 is mounted on the base plate by bolts 22 secured with nuts 23 to permit the lever 18 to be arrested in predetermined positions. For this purpose, stop 24 is longitudinally slidably mounted on the lever and may be moved along the lever by handle 25 connected to stop 24 by wire or rod 26. Depending on the position of lever 18, stop 24 engages respective transverse slots 27 provided near the respective ends of the stop plate 21. The inner end of lever 18 carries yoke 28 carrying pins 29 at its respective ends. Pins 29 cooperate with and slide in slots 30 in the follower members 14 to form a sliding coupling which transmits the pivotal movement of the lever 18 to the followers whereby the followers either block the lateral rocking movement of shaft 8 entirely, partially or not at all. While Fig. 3 illustrates the blocked shaft condition, Fig. 4 shows the lever 18 moved over so that the shaft 8 is no longer jammed and may rock from side to side about the plane of symmetry of the coupling. Fig. 5 illustrates an intermediate position in which the follower head 16 forms a stop for end webs 7 so that the shaft may rock from the position indicated in broken lines to the position indicated in full lines.

The control of the pendulum or rocking movement of the fifth wheel mounting shaft 8 is designed for use on rough cross-country rides. Under such conditions, the lever 18 will be moved so that the shaft may rock freely from side to side (Fig. 4) whereby the fifth wheel 10 may follow the corresponding lateral rocking movement of the trailer which is coupled thereto and supported thereby. When the truck train rides on a good road, the rocking movement is blocked by jamming the shaft 8 into the position of Fig. 3. An intermediate position permitting some rocking of the fifth wheel is possible, as shown in Fig. 5.

As shown in Fig. 1, the bearing pivots 15 for follower members 14 are offset in longitudinal direction. This arrangement has the effect that the yoke 28 engages the followers 14 with a larger lever moment in the blocking position shown in Fig. 1 than in the released position shown in Fig. 4. Therefore, the force exerted upon the followers increases in the blocking position while the manual force exerted on lever 18 remains constant.

Figures 6, 7:
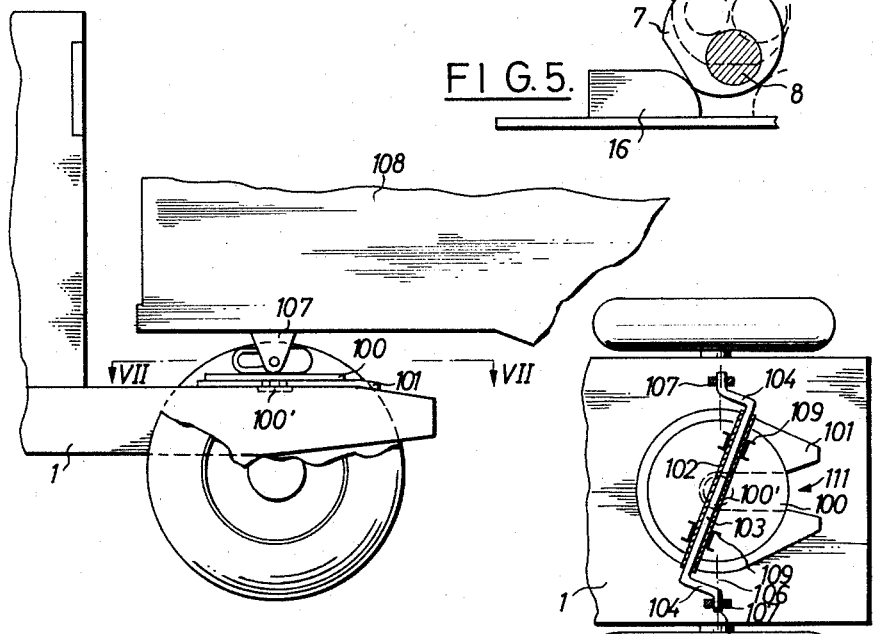
Fig. 6 is a side view of a tractor and trailer connected by a coupling incorporating another embodiment of the invention.
Fig. 7 is a horizontal section along line VII—VII of Fig. 6.

Another rocking mounting for a coupling part is illustrated in Figs. 6 and 7. As shown, a fixed platform or fifth wheel 101 is mounted on tractor chassis 1 while a movable platform 100 is mounted on the underside of trailer 108. The king or coupling pin 100' is fixedly connected to the platform 100. The king pin is inserted into entry slot 111 of the fixed fifth wheel 101 where it is locked in any suitable manner to couple the tractor 1 and trailer 108, the trailer being supported on platforms 101 and 100. The pivotal platform 100 carries the shaft 103 journaled in sleeve 102 which is mounted on the platform by bearings 109. In its normal position, the shaft is inclined in respect of the plane of symmetry of the vehicle, as shown in Fig. 7. Shaft 103 has offset bearing arms 104 with studs 105 which are journalled in the bearing brackets 107, studs 105 being coaxial, as shown by axis 106. The bearing brackets 107 are fixedly secured to the underside of the front portion of the trailer 108 (see Fig. 6).

When shaft 103 is pivoted about its longitudinal axis, the bearing arms 104 will rock from side to side on their coaxial pivots 105, which corresponds to the pendulum movement of shaft 8 in the embodiment of Figs. 1–5. It will be obvious to those skilled in the art that this rocking movement may be blocked by the same means as illustrated in connection with the other embodiment.

While the invention has been described specifically in connection with a coupling between a tractor and a trailer, it will be obvious to the skilled in the art that it is applicable to any biaxial, articulated coupling comprising two coupling parts which are connected, respectively, to a body which pulls and another body which is pulled by the first body.

What is claimed is:

1. A mounting for a coupling constituted by two coupling parts, said mounting comprising, in combination, a transverse rocking shaft fixedly connected to and supporting one of said coupling parts, a crank including a trunnion fixedly connected to each outer end of said shaft, the trunnions being positioned on a common axis of the rocking shaft, two fixed crank journals pivotally supporting said shaft trunnions, whereby said shaft is universally rotatable about a longitudinal and vertical axis, said crank journals being positioned in parallel planes perpendicular to the common axis of the trunnions and the crank lying in parallel planes and extending in opposite directions from the rocking shaft.

2. The mounting of claim 1, comprising an arresting mechanism for controlling the universal rotation of the rocking shaft and including displaceable follower members, and said cranks have flattened surface portions, the displaceable follower members being arranged for selective cooperation with said flattened surface portions of the cranks.

3. The mounting of claim 2, further comprising two two-armed levers carrying said follower members, a pivoting device and means for coupling the levers to the pivoting device.

4. The mounting of claim 3, wherein the two-armed levers are mounted longitudinally offset from each other, the pivoting device including another two-armed lever having a respective arm coupled to a respective one of said first-named two-armed levers.

5. The mounting of claim 2, wherein the follower members are shaped for engagement with the flattened surface portions of the cranks in an intermediate position to limit the stroke of the rocking movement of the shaft.

6. In a semitrailer coupling constituting a detachable, biaxial, articulated connection between two coupling parts mounted, respectively, on a tractor and a trailer: a universal mounting for one of said coupling parts and comprising a transverse rocking shaft fixedly connected to and supporting said one coupling part, the shaft being perpendicular to the plane of symmetry of the coupling, a crank including a trunnion fixedly connected to each outer end of said shaft, the trunnions being positioned on a common axis which is inclined in respect of the plane of symmetry of the coupling, whereby said shaft is universally rotatable about a longitudinal and vertical axis, two fixed crank journals pivotally supporting said shaft trunnions, said crank journals being positioned in parallel planes perpendicular to the common axis of the trunnions and the cranks lying in parallel planes and extending in opposite directions from the rocking shaft, and means for securing the crank journals to that body selected from the tractor and trailer to which said one coupling part is connected.

7. In a semitrailer coupling constituting a detachable, biaxial, articulated connection between two coupling parts mounted, respectively, on a tractor and a trailer: a universal mounting for one of said coupling parts and comprising a transverse rocking shaft fixedly connected to and supporting said one coupling part, the shaft being inclined in respect of the plane of symmetry of the coupling, a crank including a trunnion fixedly connected to each outer end of said shaft, the trunnions being positioned on a common axis which is perpendicular to the plane of symmetry of the coupling, whereby said shaft is universally rotatable about a longitudinal and vertical axis, two fixed crank journals pivotally supporting said shaft trunnions, said crank journals being positioned in parallel planes perpendicular to the common axis of the trunnions and the cranks lying in parallel planes and extending in opposite directions from the rocking shaft, and means for securing the crank journals to that body selected from the tractor and trailer to which said one coupling part is connected.

8. A mounting for a coupling constituted by two coupling parts, said mounting comprising, in combination, a transverse rocking shaft fixedly connected to and supporting one of said coupling parts, the rocking shaft being perpendicular to a plane of symmetry of the coupling, a crank including a trunnion fixedly connected to each outer end of said shaft, the trunnions being positioned in a common axis inclined in respect of said plane, two fixed crank journals pivotally supporting said shaft trunnions, whereby said shaft is universally rotatable about a longitudinal and vertical axis, said crank journals being positioned in parallel planes perpendicular to the common axis of the trunnions and the cranks lying in parallel planes and extending in opposite directions from the rocking shaft.

9. A mounting for a coupling constituted by two coupling parts, said mounting comprising, in combination, a transverse rocking shaft fixedly connected to and supporting one of said coupling parts, the rocking shaft being inclined in respect of a plane of symmetry of the coupling, a crank including a trunnion fixedly connected to each outer end of said shaft, the trunnions being positioned in a common axis perpendicular to said plane, two fixed crank journals pivotally supporting said shaft trunnions, whereby said shaft is universally rotatable about a longitudinal and vertical axis, said crank journals being positioned in parallel planes perpendicular to the common axis of the trunnions and the cranks lying in parallel planes and extending in opposite directions from the rocking shaft.

References Cited in the file of this patent

UNITED STATES PATENTS

| | | |
|---|---|---|
| 1,933,622 | Fellows | Nov. 7, 1933 |
| 2,618,488 | Ketel | Nov. 18, 1952 |
| 2,667,364 | Colpo | Jan. 26, 1954 |